May 23, 1961 J. ANDERSON ET AL 2,985,845
CRYSTAL OSCILLATOR KEYING CIRCUIT
Filed Dec. 4, 1957
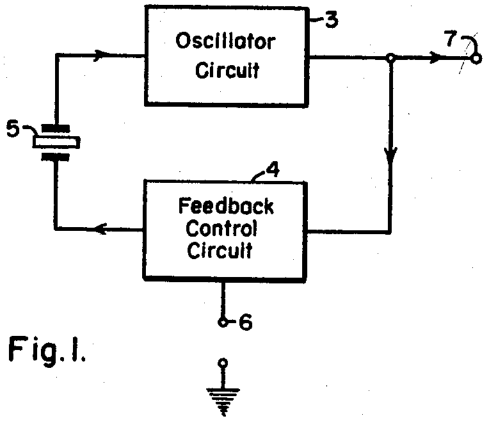
Fig. I.
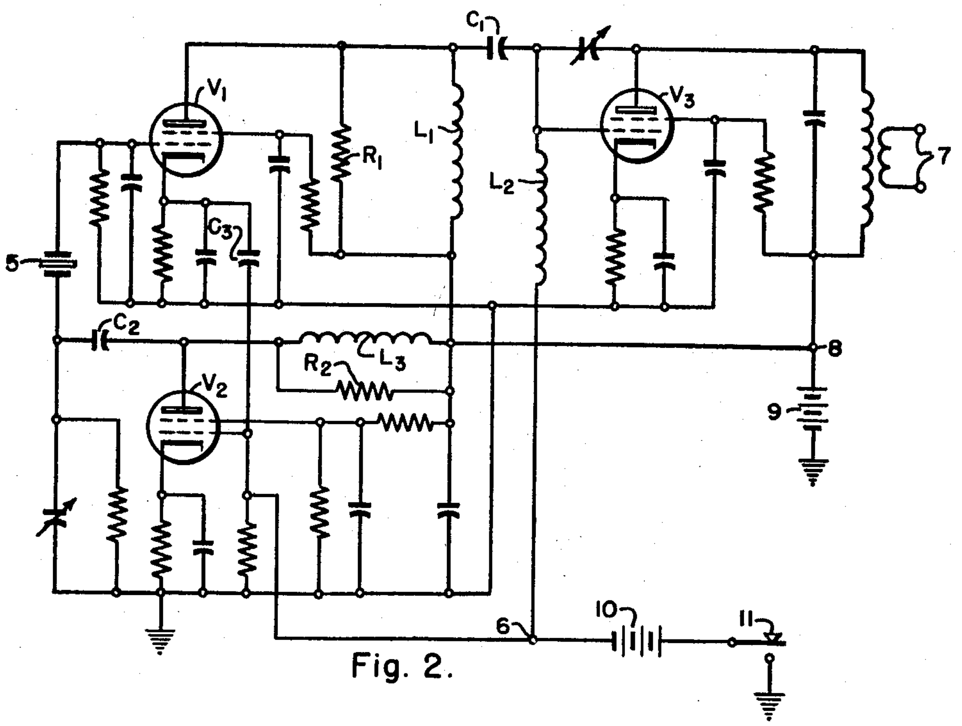
Fig. 2.
WITNESSES:
INVENTORS
James Anderson &
Joseph P. Biddiscombe.
BY
ATTORNEY United States Patent Office 2,985,845

Patented May 23, 1961

2,985,845

CRYSTAL OSCILLATOR KEYING CIRCUIT

James Anderson, Mesquite, Tex., and Joseph P. Biddiscombe, Burlington, Ontario, Canada, assignors to Canadian Westinghouse Company, Limited, Hamilton, Ontario, Canada Filed Dec. 4, 1957, Ser. No. 700,574

Claims priority, application Canada Apr. 5, 1957

3 Claims. (Cl. 331—75)

Our invention relates to crystal oscillators and in particular to improved methods of controlling or keying such oscillators.

In radio telegraph transmission it is usually necessary to make the receiver operative during periods when the transmitter is not operating. This becomes of particular importance when there is a possibility of the receiving end of the link transmitting signals to indicate that a repeat is necessary on an earlier portion of the message. To avoid swamping of the local receiver by the local transmitter during periods when there is an opportunity for the remote transmitter to send such signal, it is obviously necessary to suppress any RF radiation of the local transmitter between transmitting pulses. In the past it has been usual to permit the crystal oscillator to run continuously and bias off one of the subsequent stages to suppress RF radiation. If, however, the transmitter and receiver are on the same or adjacent frequencies there is sufficient RF leakage to swamp the receiver, even when the subsequent stage of the transmitter is cut off. Attempts have been made to stop the crystal oscillator by biasing its grid and thus prevent any generation of RF frequencies. This, however, results in damage to the crystal due to transients of the bias voltage which appear across the crystal and may be of sufficient amplitude to destroy it.

It is therefore an object of this invention to provide a keying means for a crystal oscillator which will permit complete suppression of radio-frequency oscillations and yet will not be destructive to the crystal itself. This object is attained as will be seen from the following description by controlling the positive feedback of the oscillator. By this means no transient voltage need be applied to the oscillator itself but rather the feedback circuit is controlled.

A clearer understanding of the above and other objects and features of our invention may be had from the following description of one embodiment of our invention, together with the drawings, in which:

Figure 1 is a block diagram of the system; and

Fig. 2 is a schematic diagram of a suitable circuit for the system disclosed in Fig. 1.

Considering first Fig. 1, there is shown a portion of a transmitter comprising an oscillator circuit designated 3, a feedback circuit for the oscillator circuit designated 4 and a crystal 5. This system operates as follows:

The frequency of the oscillator circuit is controlled by crystal 5 but no oscillations are produced in the circuit unless there is a feedback through the feedback control circuit 4. A control signal is introduced into the feedback circuit at terminal 6. This control signal either permits or prohibits feedback from the output of the oscillator tube to the crystal. When feedback is permitted the oscillator circuit oscillates and an output is produced at terminal 7.

The characteristic of the feedback circuit is such that the control signal is not directly applied to the crystal but merely controls the impedance of the feedback circuit.

In Fig. 2 there is shown a schematic diagram of a circuit operating in accordance with the system of Fig. 1 together with a slight refinement. In this circuit $V_1$ is the oscillator tube, $V_2$ is the feedback tube and $V_3$ is a buffer amplifier. The circuit of $V_1$ is the normal circuit for a crystal controlled oscillator except that the feedback path for the oscillator is through $V_2$. It will be seen that the grid of $V_1$ is provided with the normal resistance and capacity bias arrangement. The cathode return is arranged to provide a suitable cathode bias and the screen potentials are arranged to prevent self-oscillation of the tube. The output of $V_1$ which appears across resistance $R_1$ and inductance $L_1$ is applied through condenser $C_1$ to the grid of $V_3$. The output from the cathode of $V_1$ is also applied through condenser $C_3$ to the grid of $V_2$. $V_2$ is provided with the normal cathode biasing circuit and screen voltage circuit to prevent self-oscillation of the tube. The output from $V_2$ is applied to the lower end of the crystal 5 through condenser $C_2$. This output appears across the anode load of $V_2$ which consists of resistance $R_2$ and inductance $L_3$. The buffer stage consisting of tube $V_3$ and its associated components is a normal circuit providing an output to terminals 7. The requisite high voltage anode supply 9 is applied between terminal 8 and ground. A source of negative bias voltage 10 may be selectively applied to terminal 6, to cut-off tubes $V_2$ and $V_3$, by closing key 11. In operation, the circuit performs as follows:

Assume that no potential is applied to terminal 6. Then feedback occurs from the cathode of $V_1$ to the grid of $V_2$ which in turn is supplied to the crystal through condenser $C_2$. The tube $V_1$ oscillates at a frequency determined by crystal 5 and this output is applied to buffer $V_3$ which amplifies the oscillation and feeds it to output terminals 7. On the other hand, if a negative voltage from voltage source 10 is applied to terminal 6 in such a direction as to bias off $V_2$ and $V_3$, then $V_2$ has an extremely high impedance. No feedback occurs to the crystal through $C_2$ and $V_1$ cannot oscillate freely. To eliminate any possibility of stray oscillation being amplified by buffer amplifier $V_3$ and appearing at terminal 7, the bias also is applied to the grid of $V_3$ which will be noted, is at the same direct current potential as grid of $V_2$. This cuts off $V_3$ and insures that there is no output at terminal 7. While no values have been shown for the various components of this circuit it will be understood by one skilled in the art that the component values are dependent upon the particular characteristics of the various tubes and the desired output operating characteristics of the circuit.

The feedback control circuit 4 has been described in the particular embodiment as comprising a grid controlled vacuum tube $V_2$, however, it is to be understood that the invention is not so limited, but that feedback control circuit may utilize any one of various electronic switching circuits which are known in the art. The only essential criteria is that the circuit 4 must have a low impedance to the radio-frequency feedback signal during periods when no control signal is applied at terminal 6, and must have a high impedance when a control voltage is applied to terminal 6.

For example, the control circuit may utilize a transistor or other semiconductor amplifier in lieu of the vacuum tube $V_2$, or in certain embodiments it may be desirable to utilize a non-amplifying electronic switch such as for example a conventional cathode follower or a diode selector switch. Various selector switching circuits of types usable in the feedback control circuit 4 are shown and described in the M.I.T. Radiation Laboratory Series, vol. 19, McGraw-Hill Book Co., New York, 1949, pages 328 to 332.

It has been found that with the system of this nature at keying speeds up to 60 words a minute, oscillations are stopped completely with a sufficient negative control bias applied to terminal 6. On the other hand, at higher speeds the oscillations do not completely stop due to the inherent high Q of the quartz crystal but due to the operation of the buffer amplifier which is also keyed, it is possible to attain keying speeds as high as 300 words a minute. The absence of any attempt to vary the bias of $V_1$ eliminates the possibility of transients being fed directly to the crystal and causing fracture or other damage.

While a specific circuit has been shown which functions according to our invention, it will be understood that numerous variations could be made without departing from the scope of the invention. For example, while the feedback tube $V_2$ is shown operating as an amplifier it could conceivably be used solely as a variable impedance device without applying feedback to its grid, and numerous variations could be made in the specific circuit depending upon the particular type of tubes used.

We claim as our invention:

1. A radio-frequency generator circuit including a first amplifier resonant at a particular frequency and resonant means for determining said frequency, a feedback path including a second amplifier whose input is derived from the output of said first amplifier and whose output is applied to the input of said first amplifier, a third amplifier driven from the output of said first amplifier, and means to simultaneously control cut-off of said second and said third amplifiers.

2. In an oscillation generator, an amplifier device having an input electrode and at least one output electrode, electrically resonant means connected to said input electrode for determining the frequency of oscillation, electronic switching means, circuit means serially connected with said switching means between said output electrode and said electrically resonant means for coupling a portion of said amplifier output to said resonant means, and a keying circuit comprising means for selectively applying a cut-off bias to said switching means to control the conductivity thereof and thereby control on-off operation of said generator.

3. A radio-frequency generator comprising an electron discharge device having a grid and a plurality of other electrodes, electrically resonant means connected to said grid for determining the frequency of said generator, feedback means connected between one of said other electrodes and said resonant means for coupling a portion of the output of said discharge device to said resonant means, said feedback means including an electronic series-switch circuit having a low series impedance state and a high series impedance state, and an on-off keying circuit for said radio-frequency generator including means for applying a control signal to said electronic series-switch circuit to change said circuit from one to the other of said impedance states for controlling on-off operation of said generator.

References Cited in the file of this patent

UNITED STATES PATENTS

| | | |
|---|---|---|
| 2,392,625 | Usselman | Jan. 8, 1946 |
| 2,440,264 | Grieg | Apr. 27, 1948 |
| 2,489,327 | Royden | Nov. 29, 1949 |
| 2,554,308 | Miller | May 22, 1951 |
| 2,590,308 | Gordon | Mar. 25, 1952 |
| 2,598,722 | Richards | June 3, 1952 |
| 2,625,650 | Spencer | Jan. 13, 1953 |